No. 799,942. PATENTED SEPT. 19, 1905.
E. A. L. ROEHL.
DEVICE FOR CUTTING, SCORING, FOLDING, AND PASTING CARTONS.
APPLICATION FILED FEB. 27, 1904.

7 SHEETS—SHEET 1.

WITNESSES
C. R. Turner
A. C. Van Booskirk

INVENTOR
Edward A. L. Roehl
By J. W. Powers
atty

No. 799,942. PATENTED SEPT. 19, 1905.
E. A. L. ROEHL.
DEVICE FOR CUTTING, SCORING, FOLDING, AND PASTING CARTONS.
APPLICATION FILED FEB. 27, 1904.
7 SHEETS—SHEET 4.

WITNESSES
A. R. Turner.
H. C. VanBoskirk.

INVENTOR
Edward A. L. Roehl
By J. W. Powers
Atty.

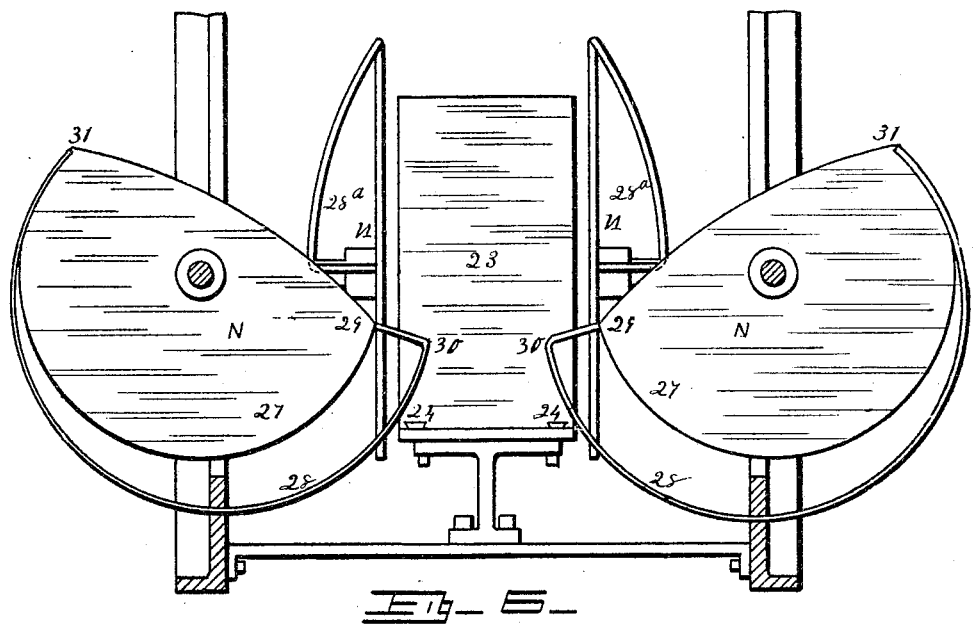
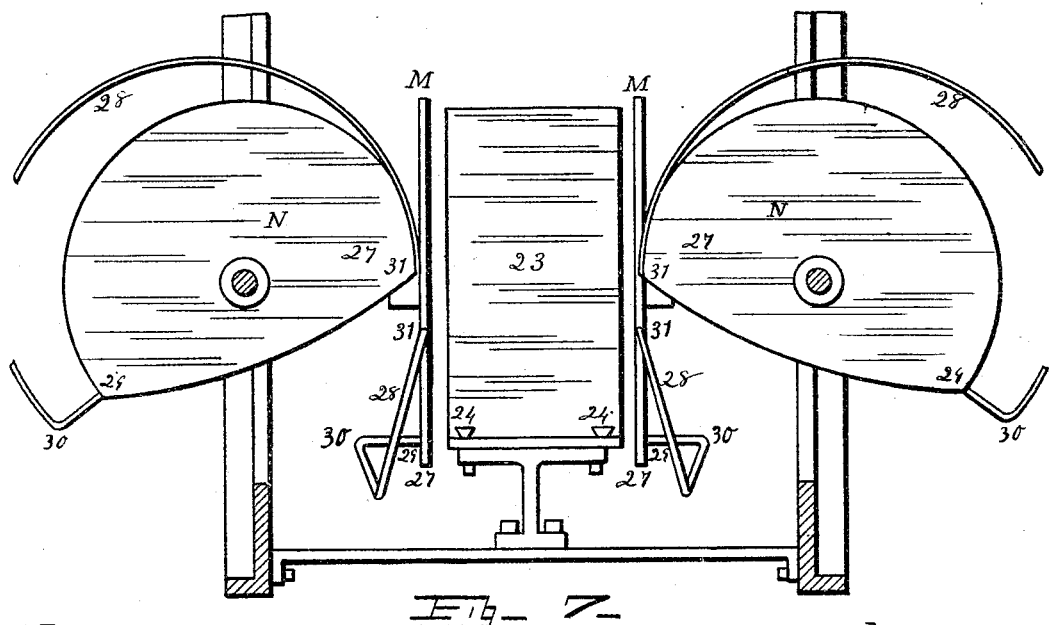

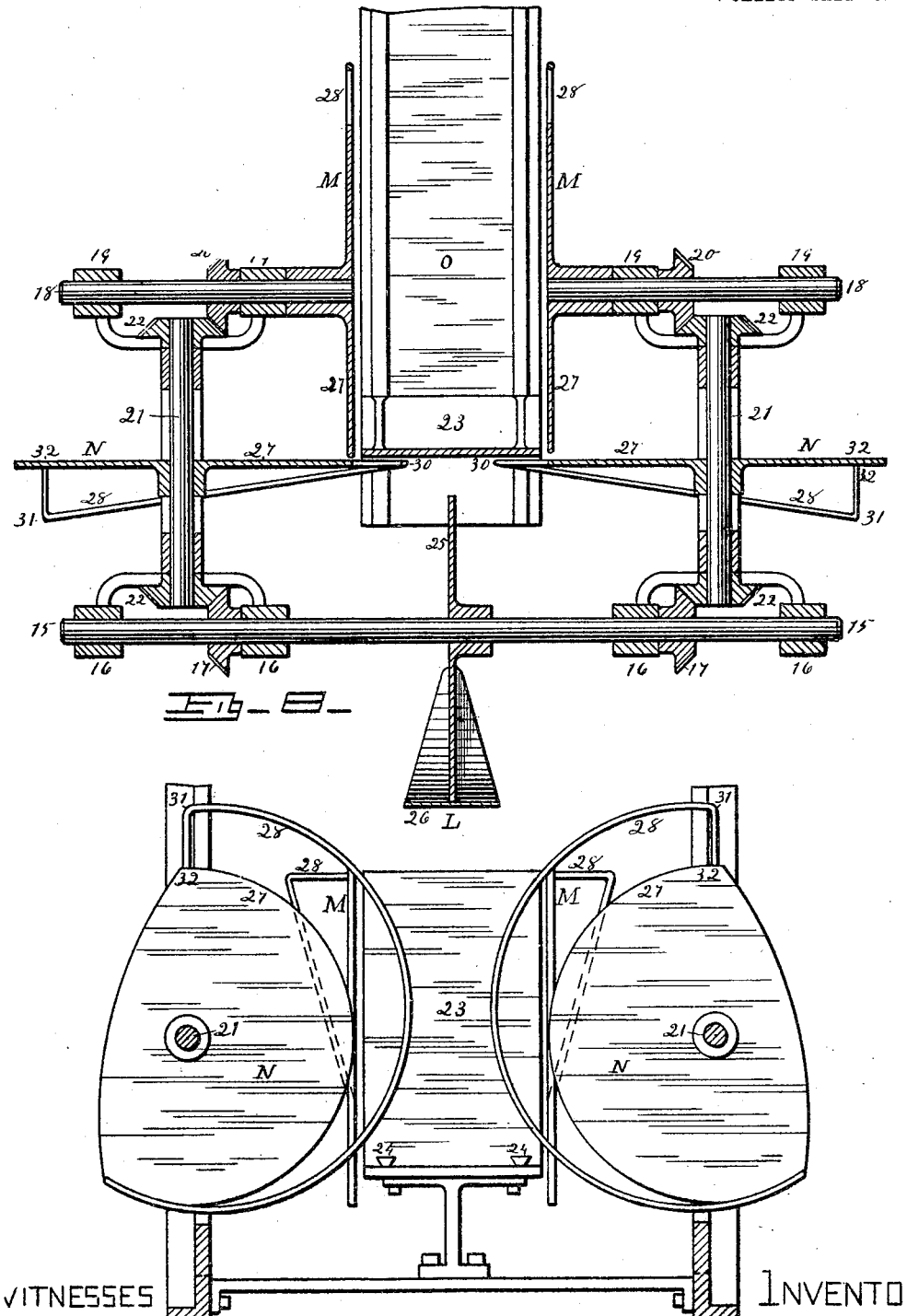

No. 799,942.
PATENTED SEPT. 19, 1905.
E. A. L. ROEHL.
DEVICE FOR CUTTING, SCORING, FOLDING, AND PASTING CARTONS.
APPLICATION FILED FEB. 27, 1904.
7 SHEETS—SHEET 7.
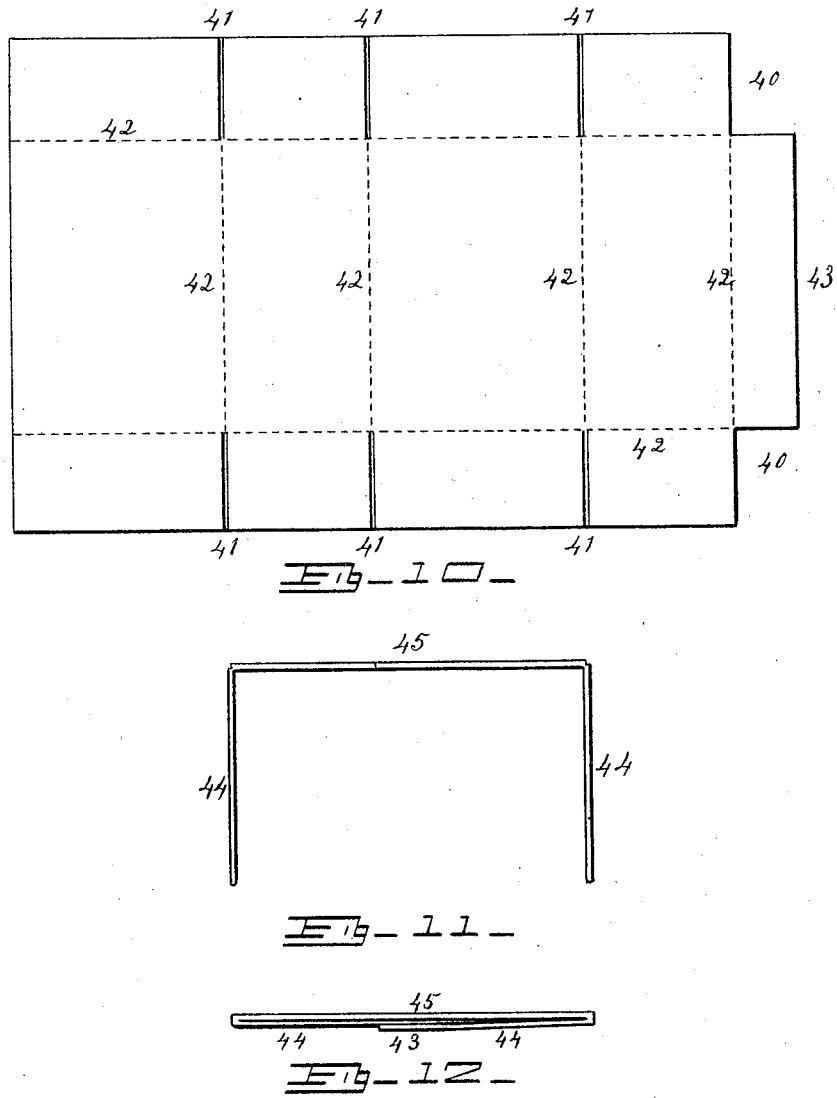

UNITED STATES PATENT OFFICE.

EDWARD A. L. ROEHL, OF MINNEAPOLIS, MINNESOTA, ASSIGNOR OF ONE-HALF TO GUSTAVE F. KRIESEL, OF MINNEAPOLIS, MINNESOTA.

DEVICE FOR CUTTING, SCORING, FOLDING, AND PASTING CARTONS.

No. 799,942. Specification of Letters Patent. Patented Sept. 19, 1905.

Application filed February 27, 1904. Serial No. 196,464.

*To all whom it may concern:*

Be it known that I, EDWARD A. L. ROEHL, of Minneapolis, in the county of Hennepin and State of Minnesota, have invented new and useful Improvements in Devices for Cutting, Scoring, Folding, and Pasting Cartons, of which the following is a full, clear, and exact description, reference being had to the accompanying drawings.

My invention relates to the manufacture of cartons, (paper boxes,) my object being the production of a machine adapted to blank the cartons, (cut them out,) score them, (cut part way through the paper upon the lines whereon they are to be folded,) fold the said blanks, and paste the overlapping edges, thus producing by a single operation a carton ready to be shipped to the user.

Figure 1:
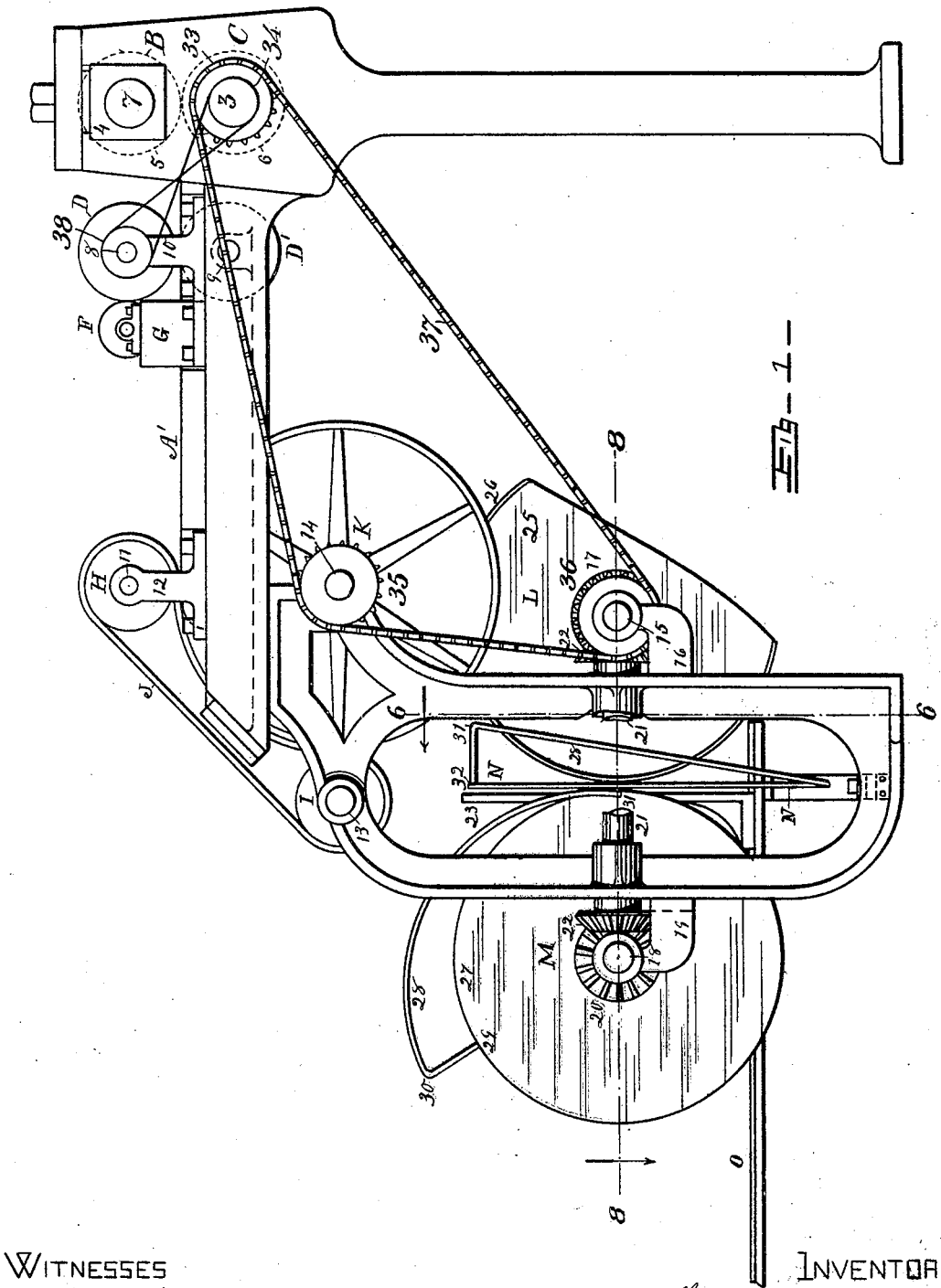
Figure 2:
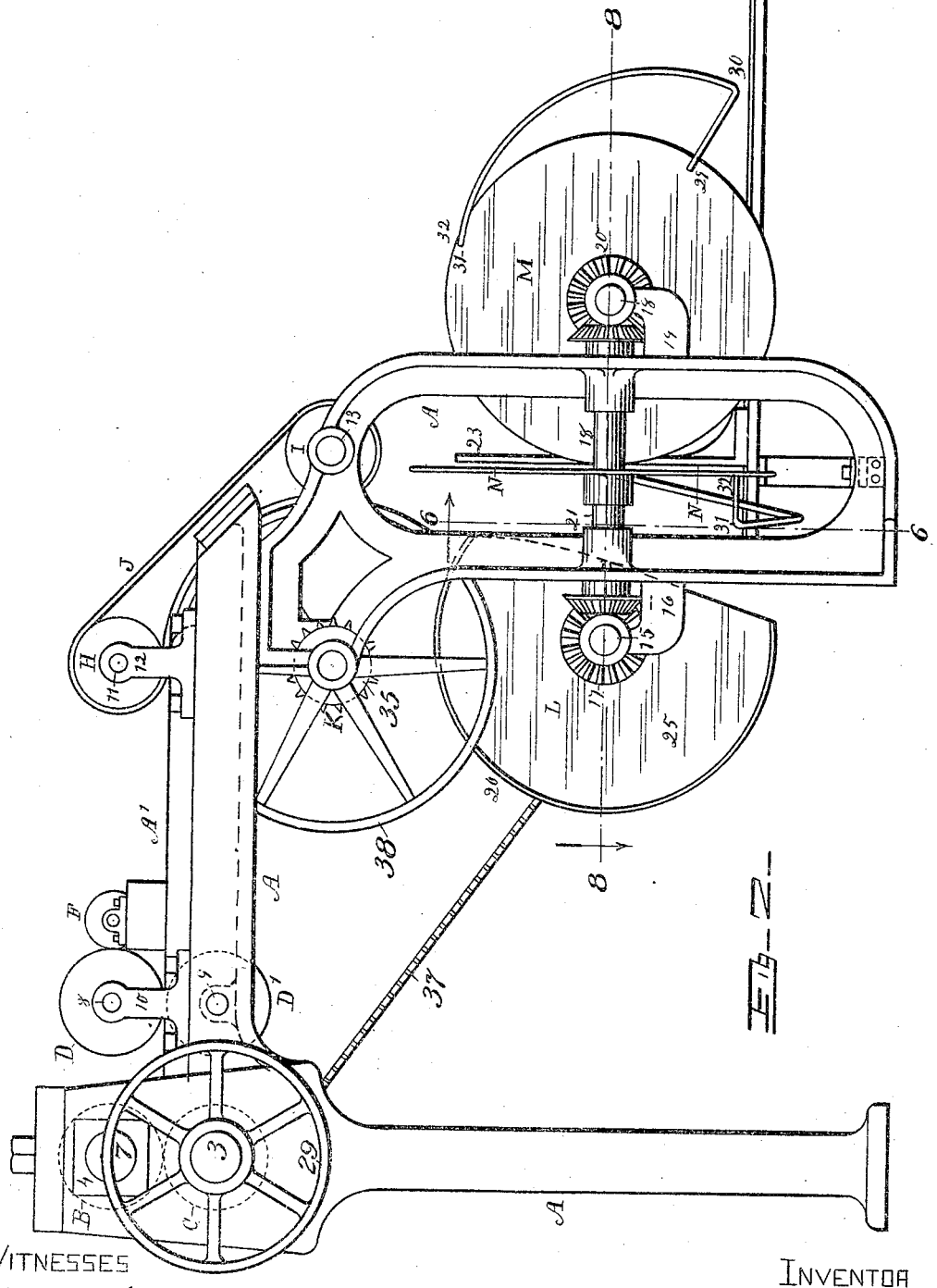
Figure 3:
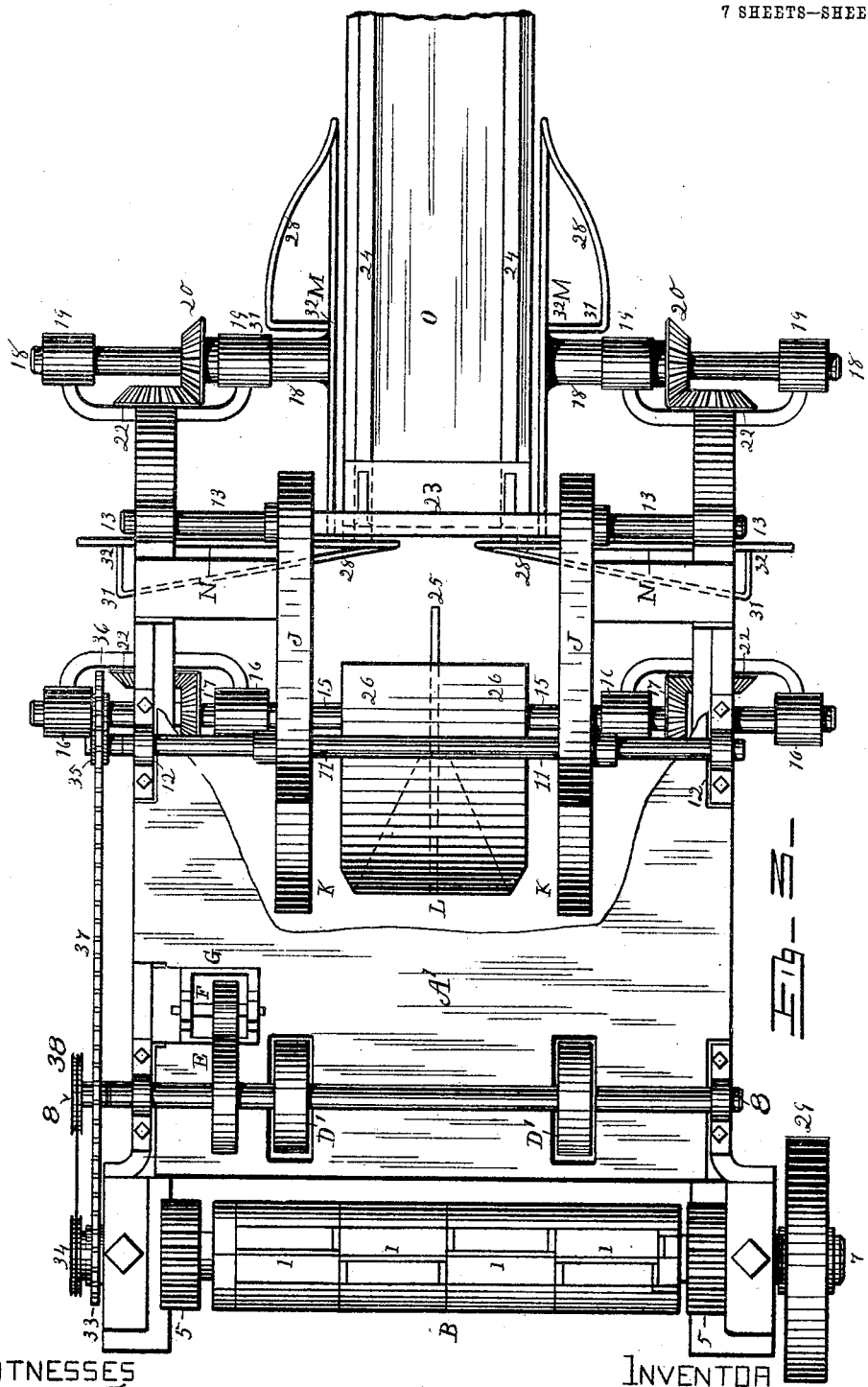
Figure 4:
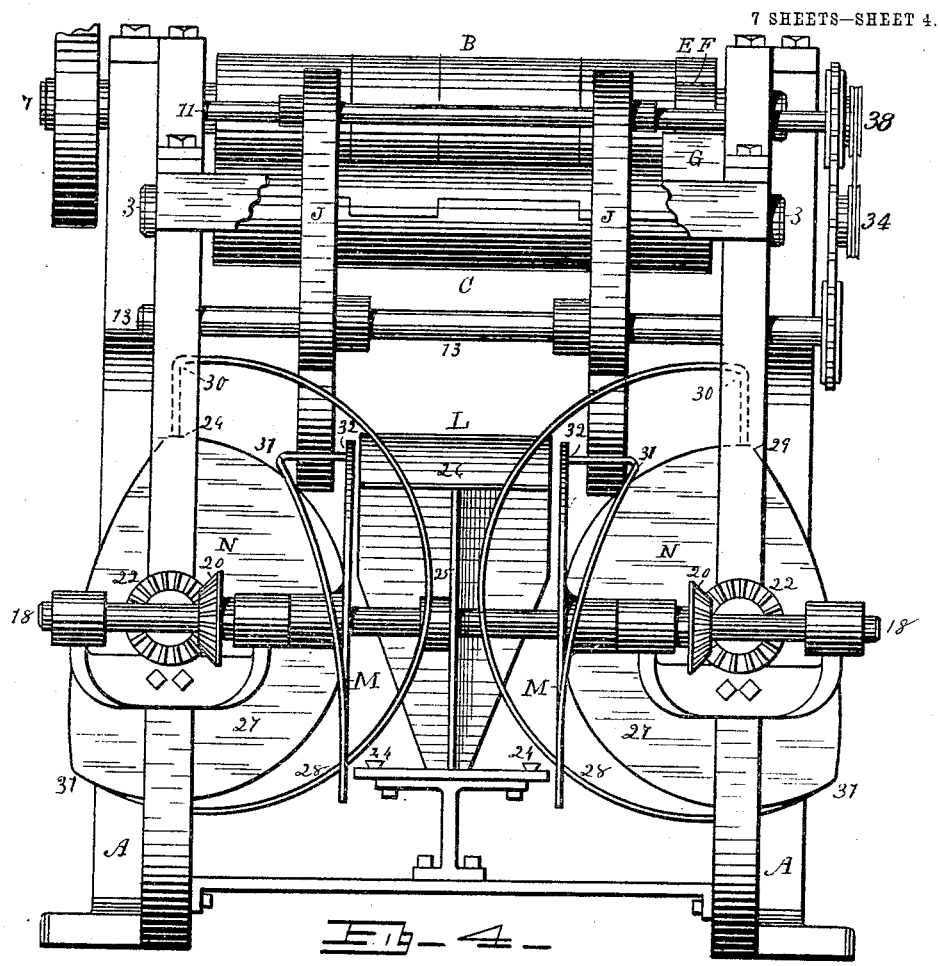
Figure 5:
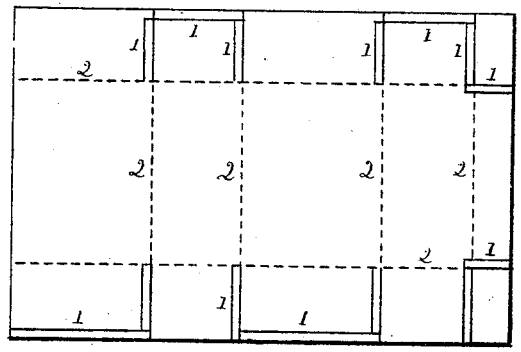

In the drawings referred to, Figure 1 is a side elevation of my device as viewed from the right; Fig. 2, the same as viewed from the left; Fig. 3, a top view; Fig. 4, a rear end elevation; Fig. 5, a detail, being a developed view of the cutting and scoring roll; Fig. 6, a vertical cross-section of Figs. 1 and 2, taken on the lines 6 6 looking in the direction indicated by the arrow; Fig. 7, the same, but showing the bending cam-wheels and the folding cam-wheels in different positions from those shown in Fig. 6; Fig. 8, a horizontal section of the same, taken on the line 8 8; Fig. 9, another vertical section of Figs. 1 and 2, taken on the line 6 6, but showing the bending cam-wheels and the folding cam-wheels in still other positions than those shown in Figs. 6 and 7; Fig. 10, a plan view of the carton-blank, showing where cut and where scored, (the scoring being shown by dotted lines;) Fig. 11, an end view of the carton-blank after the first operation of the bending and folding mechanism, (after being bent;) and Fig. 12, the same after the second operation of the bending and folding mechanism, (after being bent and folded.)

Similar letters and numerals refer to similar parts throughout the several views.

My device consists of a frame upon which is affixed or in which is journaled the operating mechanism hereinafter described, through the operation of which I accomplish the hereinbefore-declared purposes of my invention.

The frame A, I preferably construct of metal, though other material may be used. Its particular configuration is not an important feature of my invention, for it is apparent that other forms than the one herein shown would serve a like purpose. The cutting and scoring roll B is located at the upper part of the frame A, at what I will herein designate as its "front" end. This roll B, I preferably construct of cast-iron. It consists of a cylinder the length of which is equal to the width of the carton to be cut thereby and the circumference of which is equal to the length of the carton-blank to be scored thereby. This is an important feature of my invention.

In the circumferential face of the roll B are affixed longitudinal and circumferential knives 1, (shown by solid lines,) which knives are adapted to "blank" (cut out) the cartons, and with other longitudinal and circumferential knives 2, (shown by dotted lines,) which other knives are adapted to "score" (cut part way through) the paper blanks upon the lines at which the same are to be bent or folded. These cutting and scoring knives 1 and 2 are made of tempered steel and are so affixed in the roll B that they are adapted to be removed therefrom, sharpened, and reset in place when necessary. This roll B is mounted upon a shaft 7, which shaft revolves in boxes 4, adjustably set in the frame A. Mounted upon this shaft 7 are gear-wheels 5, the teeth of which engage those of similar gear-wheels 6, both of which are shown by dotted lines in Figs. 1 and 2 and one of which is shown in solid lines in Fig. 3. The last-named gear-wheels 6 are affixed upon and revoluble with the driving-shaft 3, which shaft is properly journaled in the frame A. Mounted upon the driving-shaft 3 is a cutting-roll C, (shown in elevation in Fig. 4,) which roll is of identically the same construction as the cutting and scoring roll B, mounted upon the shaft 7, save and excepting that it is provided with cutting-knives only.

Directly in the rear of the cutting and scoring roll B are located the feeding-wheels D, (two pairs,) the upper pair of which, D, lies above and the lower pair of which, D', lies below the table A' of the frame A. The lower lying pair of these feeding-wheels (shown in part by solid lines and in part by dotted lines in Figs. 1 and 2) cut through the table, that their peripheries may contact with the peripheries of those of the upper lying pair D. These two pairs of wheels D and D' are respectively mounted upon and revoluble with the shafts 8 and 9, the former, 8, being journaled in the pillow-blocks 10, affixed to the frame A, and the latter, 9, being journaled in the said frame A. Mounted upon and revoluble with this shaft 8 is the pasting-wheel E, the periphery of which contacts with and rotates the paste-distributing wheel F, the lower portion of which rotates within the paste-box G. Farther in the rear of the cutting and scoring roll B (and preferably upon the same plane therewith) are located the belt-wheels H, which wheels are mounted upon and revoluble with the shaft 11, journaled in the pillow-blocks 12. Still farther therefrom, but upon a lower plane, are located similar belt-wheels I, which wheels are mounted upon and revoluble with the shaft 13, properly journaled in the frame A. Carrying-belts J pass over, under, and around these belt-wheels H and I to transmit the power from the former to the latter. Directly beneath the shaft 11 (the shafts upon which shaft the upper belt-wheels H are mounted) and preferably on a plane with the shaft 13 (the shaft upon which the belt-wheels I are mounted) are located the deflecting-wheels K. These wheels are mounted upon and revoluble with the shaft 14, which shaft in turn is properly journaled in the frame A. These deflecting-wheels K are in alinement with the two pairs of belt-wheels H and I, their peripheries impinging and deflecting the belts J, running thereon.

The frame A, the cutting and scoring roll B, the cutting-roll C, the feeding-wheels D, the pasting-wheel E, the belt-wheels H and I, the carrying-belts J, and the deflecting-wheels K constitute the mechanism for cutting, scoring, and carrying the carton-blanks to the bending, folding, and pressing mechanism hereinafter described.

Upon a lower plane than that occupied by the mechanism above described is located the bending, folding, and pressing mechanism, consisting of the pressure cam-wheels L, the bending cam-wheels M, the folding cam-wheels N, and the carriage O.

The pressure cam-wheel L is mounted upon and revoluble with the horizontal shaft 15, lying across and journaled in double bearings 16, which bearings constitute parts of the frame A. This shaft 15 is provided at each end with the beveled gear-wheels 17. The bending cam-wheels M are respectively mounted upon and revoluble with the horizontal shafts 18, lying across and journaled in double bearings 19, which bearings constitute other parts of the frame A. These shafts are in longitudinal alinement one with the other, lie in the same plane, and are parallel with the shaft 15, carrying the pressure cam-wheel L. They are respectively provided at their outer ends with the beveled gear-wheels 20.

The folding cam-wheels N are mounted upon and revoluble with the parallel horizontal shafts 21, lying longitudinally with and suitably journaled in the frame A. These shafts 21 lie in the same plane and at right angles to the shafts carrying the pressure cam-wheel L and the bending cam-wheel M. They are provided at each end with the beveled gear-wheels 22, the teeth of which engage those of the beveled gear-wheels 17 of the shaft 15 and with the similar beveled gear-wheels 20 of the shaft 18.

Between the bending cam-wheels M is located the carriage or packing frame O, having thereon a vertically-extending head-block 23. (Shown in Figs. 1, 2, 3, 4, 6, 7, 8, and 9.) This carriage O is mounted and is longitudinally movable upon the dovetailed ways 24. (Shown in Figs. 3, 4, 6, 7, 8, and 9.) It is held normally in the position shown by means of springs or weights; but as such devices are in use for like purposes I do not deem it necessary to show or describe them herein.

The pressure cam-wheel L consists of a disk portion 25 and of a rim portion 26. The disk portion 25 is irregular in form, about two-thirds ($\frac{2}{3}$) of its periphery being an arc of a circle the center of which is the center of the shaft 16, upon which it is mounted and with which it revolves, while the remaining portion thereof may be the chord of that arc or the segment of a circle of greater radius, as shown in Figs. 1, 2, 3, and 8. The rim portion 26, which belongs only to the concentric two-thirds portion, is of uniform width for about one-half its curvilinear length, thence tapers gradually to a point, as shown in Figs. 3 and 4.

The bending cam-wheels M and the folding cam-wheel N (like the pressure cam-wheel L) consist, respectively, of disk portions and of guard portions. The disk portions 27 are of identically the same form as the disk portion 25 of the pressure cam-wheel L. Hence they need no further description. The guard portions 28 consists, preferably, of wires affixed in the peripheries of the disk portions, said wires being so configured as to perform the functions of both face and side cams. As these four guards (two pairs) are of identically the same construction, save and excepting that they are fashioned "rights" and "lefts," a description of one will suffice for all. One end of this wire is affixed in the periphery of the disk portion at 29, extends radially therefrom a short distance—say about one-third the width of the rim portion 26 of the pressure cam-wheel L at its widest point—to 30, thence in a curvilinear course with a gradually-decreasing radius, (a drawing toward the center,) but with a lateral divergence to 31, thence bent laterally toward the said disk portion, to which it is affixed at 32, thus forming a skeleton side and face cam. This guard (as viewed from the side) spans about one-half the periphery of the disk portion 27, as shown in Figs. 1, 2, 3, 4, 6, 7, 8, and 9. Upon one end of the driving-shaft 7 and outside of the frame A is affixed the driving-pulley 29, while upon its opposite end and outside the frame A are affixed the sprocket-wheel 33 and the belt-wheel 34. Upon the ends of the shafts 14 and 15, carrying, respectively, the deflecting-wheels K and the pressure cam-wheel L, are affixed two other sprocket-wheels 35 and 36, which last-named sprocket-wheels 35 and 36 are in alinement with the first-named sprocket-wheel 33. A link belt 37 is mounted upon, passed over, under, and around these three sprocket-wheels 33, 35, and 36, the operation of which will be described in its order.

Upon the outwardly-extending end of the shaft 8, which shaft carries the upper pair of feeding-wheels D and the pasting-wheel E, is affixed the belt-wheel 38, which belt-wheel is in alinement with the first-named belt-wheel 34, affixed to the driving-shaft.

The working parts of my device are operated as follows: the cutting-roll C, through power being applied to its shaft 7 by means of the driving-pulley 29; the cutting and scoring roll B, through power being transmitted thereto from the shaft 7 by means of the gear-wheels 6 and 5, the teeth of which are in engagement; the feeding-wheels D and D', through power being transmitted thereto from the driving-shaft 7 by means of the crossed belt 39, running upon the belt-wheels 34 and 38; the belt-wheels H and I, through power being transmitted thereto from the deflecting-wheels K by means of the belts J; the deflecting-wheels K and the pressure-wheel L, through power being transmitted thereto from the driving-shaft 3 by means of the link belt 37; the bending cam-wheels M, through power being transmitted thereto from the pressure-wheel L by means of the shafts 21 of the folding cam-wheels N.

I operate my device as follows: I select a roll of paper of the proper width, (as wide as the carton-blank to be formed,) which roll I mount upon a spindle, (not shown,) loosen the end of the paper from the roll, and pass it into my machine between the upper lying cutting and scoring roll B and the underlying cutting-roll C. These rolls B and C cut and score the blank cartons, the knives of the two rolls lapping by and cutting as shears, thus separating the carton-blanks from the roll, notch out the corners at 40, and slash them at 41, while the scoring-knives 2 of the upper lying cutting and scoring roll B scores (cuts part way through) the blanks at 42 along the dotted lines. The blanks thus formed then pass between the feeding-wheels D and D', through the operation of which they are carried underneath the pasting-wheel E, where their flap portions 43 (the overlapping portions) are spread with paste. They are then caught by the belts J and carried over the deflecting-wheel $k$, by means of which they are turned downward and delivered to the front side of the head-block 23 of the carriage O. Just at this instant the heads of the guards 28 of the bending cam-wheels M contact with the rear side of the carton-blank (the side next the head-block 23) and bend the portions 44 (the portions projecting outward and beyond the sides of the head-block 23) laterally forward, as shown in Fig. 11, and immediately thereafter the guards $28^a$ of the folding-wheels N contact with the outside surfaces of the said bent portions 44, folding them down upon the body portion 45 of the carton, the flap portion 43 overlapping and lying against a part of one of the portions 44, at which time the rim portion 26 of the pressure-wheel L comes round and presses the pasted flaps 43 upon the portion 44, where it is held by the next carton folded thereon. Thus in succession the cartons are blanked, carried forward, pasted, deflected, and delivered to the bending, folding, and pressing mechanism, the carriage O being shoved rearward by the addition of each carton delivered thereto until the same shall have been filled, when the whole or a part thereof may be removed, when the said carriage will be thrown back to its normal position by means of a suitable spring or weight.

What I claim, and desire to secure by Letters Patent, is—

1. In a carton cutting and folding device, the combination with a suitable frame of belt-wheels mounted upon and revoluble in the said frame, a belt running upon the said belt-wheels, a deflecting-wheel the periphery of which impinges and deflects the said belt, a pressure-wheel journaled in the said frame and underlying the said deflecting-wheel; a movable carriage having a head-block thereon against which the carton-blanks are delivered by the said belt-wheels, belt and deflecting wheel; bending cam-wheels journaled in the said frame and on opposite sides of the said head-block, said bending cam-wheels rotating in opposition to the said pressure-wheel, and folding cam-wheels journaled in the said frame and rotating at right angles to the said pressure-wheel and the said bending cam-wheels; substantially as shown and described.

2. In a carton-making machine, bending, folding and pressing mechanism comprising a frame, a shaft journaled therein and provided with reversely-faced bevel gear-wheels at either end, a presser-wheel mounted on the shaft, a pair of alined shafts parallel to said first-named shaft, a bevel-gear at the outer end of each of said alined shafts, a folding cam-wheel at the inner end of each of said alined shafts, a pair of parallel shafts arranged at right angles to the first-named shaft, reversely-faced bevel-gears upon either end of each of said last-named shafts, one pair of bevel-gears meshing with the bevel-gears on said first-named shaft and the other pair of bevel-gears meshing with the bevel-gears on said alined shafts, bending cam-wheels upon each of said last-named shafts, a carriage longitudinally movable within the said frame and between the oppositely-faced ends of the said alined shafts to receive the folded cartons, and means for rotating the shafts, substantially as shown and described.

EDWARD A. L. ROEHL.

Witnesses:
F. G. O'BRIEN,
H. J. WATERS.